United States Patent Office 2,900,409
Patented Aug. 18, 1959

2,900,409

MITICIDAL NITRILES

Samuel Allen Heininger, Dayton, Ohio, and Eugene L. Ringwald, Decatur, Ala., assignors to Monsanto Chemical Company, St. Louis, Mo., a corporation of Delaware No Drawing. Application June 25, 1956
Serial No. 593,316

5 Claims. (Cl. 260—465)

This invention relates to miticidal nitriles, and more particularly provides the hitherto unknown class comprising 3-(phenylthio)propionitriles wherein the phenyl nucleus is substituted by from 1 to 5 chlorine or bromine atoms; methods of making the same; and compositions and methods for the application of the said nitriles as miticides.

The present compounds are readily prepared by contacting the corresponding halothiophenols with acrylonitrile, preferably in the presence of an alkaline catalyst, as illustrated by the following equation:

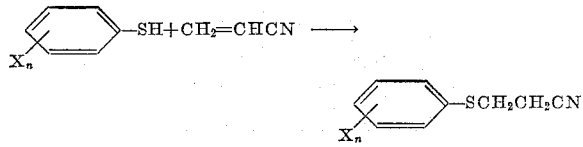

wherein X represents a halogen atom having a molecular weight of from 30 to 80, i.e. a chlorine or bromine atom, and $n$ is an integer of from 1 to 5.

The halothiophenols are readily available compounds, which may be prepared, e.g., by reduction of the corresponding halobenzenesulfonyl chlorides; pentachlorothiophenol is prepared advantageously by reacting hexachlorobenzene with sodium sulfide, followed by acidifying the reaction product.

Exemplary of compounds which may be prepared in accordance with this invention are 3-(2-chlorophenylthio)-propionitrile, 3-(3-chlorophenylthio)propionitrile, 3-(4-chlorophenylthio)propionitrile, 3 - (2,4 - dichlorophenylthio)propionitrile, 3-(3,4-dichlorophenylthio)propionitrile, 3-(2,5-dichlorophenylthio)propionitrile, 3-(2,4,5-trichlorophenylthio)propionitrile, and 3 - (pentachlorophenylthio)propionitrile; the corresponding brominated compounds, e.g., 3-(4-bromophenylthio)propionitrile, 3-(2,4-dibromophenylthio)propionitrile, 3 - (2,4,5 - tribromophenylthio)propionitrile, 3 - (3,4,5-tribromophenylthio)-propionitrile, 3 - (pentabromophenylthio)propionitrile, etc.; as well as mixed bromochlorophenyl sulfides such as 3-(3-chloro-4-bromophenylthio)propionitrile, etc.

In preparing the present compounds, the halothiophenol is simply contacted with the acrylonitrile in the presence of an alkaline catalyst until formation of the halophenyl-thiopropionitrile has occurred. As illustrated by the above equation, equimolecular quantities of the two reactants are employed in forming the desired halophenyl-thiopropionitrile product, and accordingly it is generally preferred to contact the reactants in approximately equimolecular amounts, although an excess of the more readily available component may be utilized, if desired. The present reaction is preferably carried out in the presence of an alkaline catalyst. Exemplary of such catalysts are, e.g., alkali metals; the oxides and hydroxides of alkali and alkaline earth metals, such as sodium hydroxide; alkali metal alcoholates such as sodium methylate; alkali metal cyanides such as potassium cyanide; or quaternary ammonium hydroxides such as (hydroxyethyl)trimethyl-ammonium hydroxide, benzyltrimethylammonium hydroxide, etc. Solvents or diluents may be utilized in the present reaction if desired; exemplary of presently useful solvents are, e.g., benzene, hexane, or dioxane.

The present reaction proceeds readily even at room temperature, but heating may be employed to accelerate the formation of the halophenylthiopropionitrile product if desired. Suitable temperatures range from 50° C. up to below the decomposition temperatures of the reactant. Generally, the reaction is conducted advantageously at atmospheric pressure, although sub- or super-atmospheric pressures may be employed if desired, e.g., to raise or lower the reaction temperature. The method may be adapted to either batch or continuous processes.

The isolation of the product may be accomplished by any general standard procedure, such as distillation, extraction, crystallization, etc.

The presently provided halophenylthiopropionitriles are stable, generally solid materials, useful for a variety of chemical and agricultural purposes. Thus, for example, they may be employed as fire-retarding and extending agents for waxes; as dielectric impregnants; as plasticizing agents for polymeric or rubbery materials; as chemical intermediates, etc. As disclosed in copending application, Serial No. 476,602, filed December 20, 1954, now U.S. 2,819,197 by Philip H. Santmyer and Samuel Allen Heininger, the halophenylthiopropionitriles may be used as nematocides. The present compounds are also useful as herbicides, producing severe damage to both grasses and broadleaf plants when applied as foliage sprays at a concentration of 0.5% of active chemical in an emulsion formulation. In addition, these thio compounds are unexpectedly effective miticides. The tetra- and pentahalo compounds may also be used as bactericides.

The invention is further illustrated but not limited by the following examples:

EXAMPLE 1

To a mixture of 480 g. (3.32 moles) of p-chlorothiophenol in 250 ml. of dioxane were added 15 ml. of a 35% methanol solution of benzyltrimethylammonium hydroxide. Acrylonitrile was then gradually added to this mixture until a total of 212 g. (4.0 moles) of the nitrile had been added over a period of one hour. The temperature of the reaction was held at below 40° C. by cooling in an ice bath during the introduction of the nitrile. When the addition was complete, the reaction mixture was poured into 2 liters of water, whereupon a white solid precipitated. This was filtered off and dried, to give 655 g. of 3-(4-chlorophenylthio)propionitrile, which, after recrystallization from ethanol, melted at 54–55° C. The product analyzed as follows:

| Percent | Found | Calcd. for $C_9H_8ClNS$ |
|---|---|---|
| C | 54.82 | 54.8 |
| H | 4.29 | 4.08 |
| N | 7.58 | 7.09 |
| Cl | 17.29 | 17.99 |
| S | 15.96 | 16.2 |

EXAMPLE 2

A mixture of 42.3 g. (0.15 mole) of pentachlorothiophenol, 26.5 g. (0.5 mole) of acrylonitrile, 0.5 g. of sodium methylate and 400 ml. of dry benzene was refluxed for 12 hours. The reaction mixture was decanted and concentrated to about 250 ml. An equal volume of methanol was added thereto and the solution was cooled, whereupon there precipitated a yellow powder which was filtered off and dried. By further concentration and mixing with methanol, additional fractions were obtained, to provide a total yield of 41.8 g. (83% yield) of 3-(pentachlorophenylthio)propionitrile. After two recrystallizations from ethanol, the pentachlorophenylthiopropionitrile melted at 112–114° C. and analyzed as follows:

| Percent | Found | Calcd. for $C_9H_4Cl_5NS$ |
|---|---|---|
| C | 31.84 | 32.25 |
| H | 1.63 | 1.20 |
| N | 4.10 | 4.18 |

EXAMPLE 3

This example describes the evaluation of a halophenylthiopropionitrile as a miticide.

An aqueous dispersion containing 0.1% of the 3-(4-chlorophenylthio)propionitrile of Example 1 was prepared by grinding 0.1 g. of the nitrile with 0.2 g. of a wettable powder base and then gradually adding water thereto. This dispersion was poured into a flat crystallizing dish and the leaf of a Woods Prolific lima bean plant previously infested with two-spotted spider mites (*tetranychus telarius*) was dipped therein. After draining and drying, the leaf stem was set in the greenhouse and observed after 48 hours and after 7 days. It was found that this treatment produced 100% kill of the mobile and resting stages as well as of the eggs of the mite, while retaining 100% residual activity after 7 days. By contrast, the unchlorinated thio compound, 3-(phenylthio)propionitrile, tested under the same conditions, was found to have no toxicity to any life stage of the spider mite. Utilizing a similar procedure, it was found that 3-(4-chlorophenoxy)propionitrile, applied in the same manner and at the same concentration, produced no kill whatsoever of the resting stages and eggs of the spider mite, nor did this compound possess residual activity. These data are summarized in the following table.

*Percent toxicity to* Tetranychus telarius *at 0.1%*

| Propionitrile | Mobile Stages | Resting Stages | Eggs | Residual |
|---|---|---|---|---|
| 3-(4-chlorophenylthio- | 100 | 100 | 100 | 100 |
| 3-(phenylthio- | 0 | 0 | 0 | 0 |
| 3-(4-chlorophenoxy- | 97 | 0 | 0 | 0 |

It will be obvious that residual activity is of great importance in the application of miticides, since obtaining kill only of the active stages of a pest species, without destroying the eggs and quiescent stages of the organism, is evidently futile when the pest species, like spider mites, have a brief reproductive cycle. By application of the present uniquely effective thio compounds having residual activity, there is afforded efficient and prolonged protection of the plants from the attack of developing populations of mites.

The present halophenylthiopropionitriles are advantageously applied for miticidal use in the form of sprays or dusts. Useful sprays may be prepared by dispersing the present products in water with the aid of a wetting agent or wettable powder, such as pyrophyllite, to produce sprayable aqueous dispersions. In other procedures, the products may be dissolved in an oil (whereby is meant a water-immiscible organic liquid) and then mixed with an emulsifying agent, to produce an emulsifiable concentrate which may be diluted with water to form an oil-in-water emulsion useful for application to agricultural crops as a spray. Suitable emulsifying agents for preparing the dispersions and emulsions described above are, e.g., long-chain alkylbenzenesulfonates, polyalkylene oxides, sulfates of long-chain alcohols such as octadecanol, etc.; other emulsifying agents suitable for the present purpose are described, e.g., in U.S. Department of Agriculture Bulletin E607. The present nitriles may also be dissolved in liquefied gases such as fluorochloroethanes or methyl chloride, and applied to plants, etc., from aerosol bombs. Instead of employing liquids as carriers and diluents, insecticidal dusts which contain the present halophenylthionitriles as active ingredients may be prepared, e.g., by incorporating the active nitrile with a solid carrier such as talc, bentonite, fuller's earth, etc.

The amount of the miticidally active compounds in the compositions as applied will vary with the active ingredients, the manner of application, the species which is to be destroyed, the resistance of the crop plant sprayed, etc., and formulations and rates of applications are suitably adjusted in accordance with these factors.

It is apparent that this invention may be extended to uses beyond those specifically described and that many widely differing embodiments can be made without departing from the spirit and scope thereof. Therefore, it is not intended to be limited except as indicated in the appended claims.

What is claimed is:
1. Halophenylthiopropionitriles of the formula

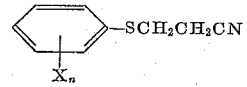

where X represents a halogen of molecular weight of from 30 to 80, and $n$ represents an integer of from 1 to 5.

2. A halophenylthiopropionitrile of the formula

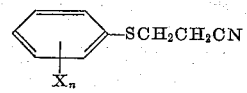

where X represents chlorine and $n$ represents an integer of from 1 to 5.

3. A polychlorophenylthiopropionitrile as described in claim 2 wherein the value of $n$ is greater than 3.

4. 3-(pentachlorophenylthio)propionitrile.

5. 3-(4-chlorophenylthio)propionitrile.

References Cited in the file of this patent
UNITED STATES PATENTS

| 2,174,568 | Davies et al. | Oct. 3, 1939 |
| 2,413,917 | Harmon | Jan. 7, 1947 |
| 2,580,550 | Jelinek | Jan. 1, 1952 |
| 2,671,798 | Chamberlain et al. | Mar. 9, 1954 |
| 2,761,806 | Boyer | Sept. 4, 1956 |
| 2,790,818 | Journeay | Apr. 30, 1957 |
| 2,819,197 | Santmyer et al. | Jan. 7, 1958 |